US012634668B2

(12) United States Patent
Alvarez Dominguez et al.

(10) Patent No.: US 12,634,668 B2
(45) Date of Patent: May 19, 2026

(54) RETRIEVING AUTOMOTIVE INFORMATION IN THE CELLULAR NETWORKS

(71) Applicant: Telefonaktiebolaget LM Ericsson (publ), Stockholm (SE)

(72) Inventors: Rodrigo Alvarez Dominguez, Madrid (ES); Alfonso De Jesus Perez Martinez, Madrid (ES); Miguel Angel Puente Pestaña, Madrid (ES); Miguel Angel Muñoz De La Torre Alonso, Madrid (ES)

(73) Assignee: TELEFONAKTIEBOLAGET LM ERICSSON, (Publ) Stockholm (SE)

( * ) Notice: Subject to any disclaimer, the term of this patent is extended or adjusted under 35 U.S.C. 154(b) by 492 days.

(21) Appl. No.: 18/023,210

(22) PCT Filed: Mar. 31, 2021

(86) PCT No.: PCT/EP2021/058485
§ 371 (c)(1),
(2) Date: Feb. 24, 2023

(87) PCT Pub. No.: WO2022/063440
PCT Pub. Date: Mar. 31, 2022

(65) Prior Publication Data
US 2023/0319529 A1 Oct. 5, 2023

(30) Foreign Application Priority Data
Sep. 23, 2020 (EP) .................................... 20382837

(51) Int. Cl.
*H04W 4/44* (2018.01)
(52) U.S. Cl.
CPC .................................... *H04W 4/44* (2018.02)

(58) Field of Classification Search
CPC .......... H04W 4/44; H04W 4/00; H04W 4/02; H04W 4/025; H04W 4/026; H04W 4/027;
(Continued)

(56) References Cited

U.S. PATENT DOCUMENTS 9,531,559 B1 * 12/2016 Vlaminck ............... H04L 67/10
11,665,632 B2 * 5/2023 Prabhakar ............. H04W 48/18
455/432.1
(Continued)

OTHER PUBLICATIONS

3rd Generation Partnership Project, "3rd Generation Partnership Project; Technical Specification Group Core Network and Terminals; T8 reference point for Northbound APIs; (Release 16)", Technical Specification, 3GPP TS 29.122 V16.4.0, Dec. 2019, pp. 1-338, 3GPP.
(Continued)

*Primary Examiner* — Yuwen Pan
*Assistant Examiner* — Samuel H. Leonard
(74) *Attorney, Agent, or Firm* — COATS & BENNETT, PLLC

(57) ABSTRACT

The invention relates to a method for operating a network exposure entity (100) in a cellular network, the method comprising receiving (S30) a first request from an application entity requesting vehicle related information, the vehicle related information comprising a vehicle identifier and at least one vehicle related parameter of a vehicle. A subscription request is transmitted to a collecting entity (200, 700) configured to collect the vehicle related information for the vehicle, the transmitted subscription request comprising the at least one vehicle related parameter. A first notification is received from the collecting entity in response to the subscription, the response comprising information related to the at least one vehicle related parameter, and a second notification is transmitted to the application entity
(Continued)

comprising the vehicle identifier and the information related to the at least one vehicle related parameter.

10 Claims, 11 Drawing Sheets

(58) Field of Classification Search
CPC .......... H04W 4/30; H04W 4/40; H04W 4/60; H04W 8/00; H04W 8/18; H04W 8/20; H04W 8/205; H04W 8/22; H04W 8/24
See application file for complete search history.

(56) References Cited

U.S. PATENT DOCUMENTS

| | | | | |
|---|---|---|---|---|
| 2017/0039784 | A1* | 2/2017 | Gelbart | H04W 4/44 |
| 2017/0048713 | A1* | 2/2017 | Guday | H04W 12/35 |
| 2017/0345228 | A1* | 11/2017 | Dibb | H04W 4/44 |
| 2018/0084103 | A1* | 3/2018 | Hamilton | H04M 1/6075 |
| 2019/0378355 | A1* | 12/2019 | Bruneel, II | H04W 4/40 |
| 2019/0380012 | A1* | 12/2019 | Bai | H04W 4/40 |
| 2020/0336541 | A1* | 10/2020 | Naderi Alizadeh | G05D 1/0088 |
| 2020/0349776 | A1* | 11/2020 | Yeung | G07C 5/008 |
| 2021/0092568 | A1* | 3/2021 | Namiranian | H04W 4/24 |
| 2021/0120596 | A1* | 4/2021 | Youn | H04W 76/12 |
| 2021/0185484 | A1* | 6/2021 | Zhou | H04W 4/44 |
| 2021/0219115 | A1* | 7/2021 | Ogawa | G06F 13/00 |
| 2021/0274392 | A1* | 9/2021 | Dao | H04W 36/0033 |
| 2022/0024476 | A1* | 1/2022 | Lund | B60K 35/80 |
| 2022/0030430 | A1* | 1/2022 | Lund | H04W 8/24 |
| 2022/0060388 | A1* | 2/2022 | Li | H04L 41/0816 |
| 2022/0095260 | A1* | 3/2022 | Shan | H04W 60/04 |
| 2022/0126864 | A1* | 4/2022 | Moustafa | H04W 4/40 |
| 2022/0335754 | A1* | 10/2022 | Palai | G07C 5/008 |
| 2023/0036993 | A1* | 2/2023 | Velev | H04W 48/06 |
| 2023/0117382 | A1* | 4/2023 | Zhang | H04L 41/14 709/224 |
| 2024/0056367 | A1* | 2/2024 | Samdanis | H04L 41/5067 |
| 2024/0259857 | A1* | 8/2024 | Zhu | H04W 76/11 |
| 2025/0350997 | A1* | 11/2025 | Sun | H04W 28/10 |

OTHER PUBLICATIONS

3rd Generation Partnership Project, "3rd Generation Partnership Project; Technical Specification Group Services and System Aspects; Architecture enhancements for 5G System (5GS) to support network data analytics services (Release 16)", Technical Specification, 3GPP TS 23.288 v16.3.0, Mar. 2020, pp. 1-62, 3GPP.

* cited by examiner

S91    Receive first request for vehicle info

S92    Transmit subscription request

S93    Receive notification with vehicle parameter

S94    Transmit notification with vehicle parameter to AF

Module for receiving request with vehicle ID and parameter 410

Module for transmitting subscription request 420

Module for receiving notification with vehicle parameter 430

Module for transmitting with vehicle ID and parameter 440

400

Processing unit 120 memory 130

I/O 110

100

500

510 — Module for receiving subscription request

520 — Module for monitoring vehicle related parameter

530 — Module for transmitting notification with vehicle parameter

200

220 — Processing unit

230 — memory

210 — I/O

RETRIEVING AUTOMOTIVE INFORMATION IN THE CELLULAR NETWORKS

TECHNICAL FIELD

The application relates to a method for operating a network exposure entity in a cellular network and to the corresponding network exposure entity. Furthermore, a method for operating a user equipment provided in a vehicle and connected to the cellular network is provided and the corresponding user equipment. Furthermore, a method for operating a subscriber database of a cellular network is provided and the corresponding subscriber database. In addition, a method for operating a network data analytics entity is provided and the corresponding network data analytics entity. Furthermore, a computer program and a carrier comprising the computer program is provided and a system comprising at least two of the entities mentioned above.

BACKGROUND

FIG. 1 shows a 5G New Radio, NR, architecture with service based interfaces in the Service Based Architecture (SBA). Service Based Interfaces are represented in the format Nxyz, such as Nsmf, and point to point interfaces in the format Nx, such as N4.

The 5G core network part comprises a Network Slice Selection Function (NSSF) 10, a Network Exposure Function (NEF) 15, a Network Repository Function (NRF) 20, a Policy Control Function (PCF) 25, a Unified Data Management (UDM) 30, an Application Function (AF) 35, an Authentication Server Function (AUSF) 40, an Access and Mobility Management Function (AMF) 45, and a Session Management Function (SMF) 50. Having service based interfaces in the 5G Core Control Plane (CP), implies that the Network Functions (NFs) in the 5G Core CP provide services that are consumed by other NFs in the 5G Core CP. A User Equipment (UE) 60, is connected to the Radio Access Network (RAN) 65, wherein a User Plane Function (UPF) 70 is provided to connect the UE 60 to a Data Network (DN) 75. Finally a Network Data Analytics Function 80 is provided which collects data and provides analytics services using a request or subscriber model.

SBA: In 5G core network architecture, the 'network elements' is made available through Application Programming Interfaces (APIs). These 'network elements', are defined as Network Functions (NFs), and the architecture where each NF offers one or more service to other NFs is called Service-Based Architecture, SBA.

In the following, some of the functions/nodes are explained in more detail.

The Application Function 35 (AF) interacts with the 3GPP Core Network, and specifically in the present context to provide information to the network operator and to subscribe to certain events happening in operator's network.

The Network Exposure Function 15 (NEF) supports different functionality and specifically in the present context, NEF 15 acts as the entry point into operator's network, so an external AF interacts with the 3GPP Core Network through NEF.

The Policy Control Function 25 (PCF) supports unified policy framework to govern the network behaviour. Specifically, PCF 25 provides PCC (Policy Control and Charging) rules to the SMF 50.

The Session Management function 50 (SMF) supports different functionality, specifically, SMF configures UPF 70 (e.g. for event reporting).

The User Plane function 70 (UPF) supports handling of user plane traffic based on the rules received from SMF, specifically, packet inspection and different enforcement actions (e.g. event detection and reporting).

CAN (Controller Area Network) bus is the most common bus for internal communications in a car. It is used for connecting ECU (Electronic Control Units). LIN (Local Interconnect Network) is another bus employed in car for connecting non-critical car subsystems.

In a vehicle environment Seat belt sensor signals using the CAN bus can send the usage of seat belt towards the ECU (Engine Control Unit). ICE (In Car Entertainment) is a collection of hardware and software that provides audio and video entertainment. Connected car is a car that is equipped with Internet access.

The Connectivity Unit (CU) manages the vehicle's connections to the outside world. It enables innovative new services that significantly enhance driver and passenger safety and convenience. An example is the Emergency Call service, or eCall. Thanks to its connection to the vehicle network and its use of cellular network communications, like LTE, the Connectivity Unit is highly flexible and can be used to enable a variety of communication and connectivity options. Additional sensors, such as accelerometers and crash detectors, can be integrated or connected directly to the unit. Since it is equipped with a built-in cellular module, this central car communication unit can also provide passengers with a wireless hotspot.

The CU was initially developed for commercial vehicles, to help fleet operators keep track of their vehicles and their technical condition. Reliable connectivity is a prerequisite for intelligent transport systems (ITS) that will provide the safety, efficiency and mobility advancements of the future through vehicle-to-vehicle and vehicle-to-infrastructure (V2X) communications. The CU is the basic building block in enabling these functions.

On Board Diagnostics systems give the vehicle owner or repair technician access to the status of the various vehicle sub-system.

There are some examples of use cases that need to be triggered from Application Function in order to get some information of the vehicle. Here there are some use cases where an external entity needs to check some parameters of the vehicle.

By way of example, there is a type of vehicle insurance whereby the costs are dependent upon type of vehicle used, measured against time, distance, behavior and place. There are two types PAYD (Pay As You Drive) or PHYD (Pay How you Drive), both are usage-based insurance. In this case, insurance companies need to check speed of the vehicle versus position of the vehicle.

Government starts using drones for prosecuting those vehicles which exceed speed limits. They take photos of the car and with its approved/homologated radar, government can accuse drivers based on that. Police needs to check speed of the vehicle.

There is an automated toll payment with Telepass where vehicles are automatically charged according to kilometers travelled on this highway. Telepass need to check credit card of vehicle and/or occupancy of cars for providing discounts for those with more than one passenger. In many countries, there are specific lanes for cars with high occupancy inside them so Telepass need to check occupancy of the car.

Accordingly, there a great number of use cases that need to check some parameters of the vehicle triggered by an external entity.

Accordingly, a need exists to provide an effective possibility to retrieve vehicle-related information by an entity external to the vehicle.

SUMMARY

This need is met by the features of the independent claims. Further aspects are described in the dependent claims.

According to a first aspect, a method for operating a network exposure entity is provided in a cellular network, wherein the method comprises the steps of receiving a first request from an application entity requesting vehicle-related information, wherein the vehicle-related information comprises a vehicle identifier and at least one vehicle-related parameter of a vehicle. Furthermore, a subscription request is transmitted to a collecting entity configured to collect the vehicle-related information for the vehicle, wherein the transmitted subscription request comprises the at least one vehicle-related parameter. A first notification is received from the collecting entity in response to the subscription and the response comprises information related to the at least one vehicle-related parameter. Furthermore, a second notification is transmitted to the application entity comprising the vehicle identifier and the information related to the at least one vehicle-related parameter.

Furthermore, the corresponding network exposure entity is provided comprising a memory and at least one processing unit, wherein the memory contains instructions executable by the at least one processing unit, wherein the network exposure entity is operative to work as discussed above or as discussed in further detail below.

As an alternative, a network exposure entity is provided comprising a first module configured to receive a first request from an application entity requesting vehicle-related information, wherein the vehicle-related information comprises a vehicle identifier and at least one vehicle-related parameter of a vehicle. The network exposure entity comprises a second module configured to transmit a subscription request to a collecting entity configured to collect the vehicle-related parameter for the vehicle, wherein the transmitted subscription request comprises the at least one vehicle-related parameter. A third module is provided configured to receive a first notification from the collecting entity in response to the subscription, wherein the response comprises information related to the at least one vehicle-related parameter. The network exposure entity comprises a fourth module which is configured to transmit a second notification to the application entity comprising the vehicle identifier and the information related to the at least one vehicle-related parameter.

Accordingly, the network exposure entity is asked by the application entity to provide a certain vehicle-related parameter, the exposure entity asks the subscriber database if the parameter can be provided or not and in the affirmative it subscribes to the corresponding node, the collecting entity, for obtaining this parameter. When the parameter is received from the collecting node, the corresponding information is transmitted to the application entity which is thus informed of the required vehicle-related parameter.

The collecting entity can be a user equipment or a network data analytics entity.

Furthermore, a method for operating a user equipment provided in a vehicle is provided, wherein the user equipment is connected to a cellular network. The user equipment receives the subscription request from the network exposure entity comprising at least one vehicle-related parameter. Furthermore, the user equipment monitors the at least one vehicle-related parameter and transmits a notification to the network exposure entity which comprises information related to the at least one vehicle-related parameter.

Furthermore, the corresponding user equipment is provided comprising a memory and at least one processing unit, wherein the memory contains instructions executable by the at least one processing unit, wherein the user equipment is operative to work as discussed above or as discussed in further detail below.

Alternatively, the user equipment comprises a first module configured to receive the subscription request from the network exposure entity of the cellular network, wherein the subscription request comprises at least one vehicle-related parameter. The user equipment comprises a second module configured to monitor the at least one vehicle-related parameter and a third module configured to transmit a notification to the network exposure entity, wherein the notification comprises information related to the at least one vehicle-related parameter.

Accordingly, the user equipment, working as one option of the collecting entity, receives the request to monitor the vehicle-related parameter and based on the instructions provided in the subscription or based on the conditions mentioned in the subscription the vehicle-related parameter is transmitted to the network exposure entity.

Furthermore, a method for operating a subscriber database of a cellular network is provided, wherein the method comprises the step of receiving a registration request from a session control entity of the cellular network for a user equipment connected to a vehicle, wherein the registration request comprises vehicle-related parameters and a communication channel where each of the vehicle-related parameters is exposed, wherein the communication channel identifies a collecting entity configured to collect each of the vehicle-related parameters. Furthermore, a profile request from the session control entity is received for a subscriber profile of the user equipment. A response is transmitted to the session control entity in response to the received profile request, wherein the response comprises the communication channel. Furthermore, a request is received from the network exposure entity requesting which collecting entity is configured to collect at least one of the vehicle-related parameters. The subscriber database transmits a response to the network exposure entity in response to the received request, wherein the response comprises a collecting entity identifier which identifies the collecting entity which is configured to collect the at least one vehicle-related parameter.

Furthermore, the corresponding subscriber database is provided comprising a memory and at least one processing unit, wherein the memory contains instructions executable by the at least one processing unit, wherein the subscriber database is operative to work as discussed above or as discussed in further detail below.

As an alternative, a subscriber database is provided the database comprising a first module configured to receive a registration request from a session control entity of a cellular network for a user equipment connected to a vehicle, wherein the registration request comprises vehicle-related parameters and a communication channel where each of the vehicle-related parameters is exposed. The communication channel furthermore identifies a collecting entity which is configured to collect each of the vehicle-related parameters.

The database comprises a second module configured to receive a profile request from the session control entity for a subscription profile of the user equipment. A third module is configured to transmit a response to the session control entity in response to the received profile request, wherein the response comprises the communication channel. Furthermore, a fourth module is provided configured to receive a request from a network exposure entity requesting which collecting entity is configured to collect at least one of the vehicle-related parameters. The subscriber database comprises a fifth module configured to transmit a response to the network exposure entity in response to the received request, wherein the response comprises a collecting entity identifier which identifies the collecting entity which is configured to collect the at least one vehicle-related parameter.

The subscriber database informs the entities or functions in the cellular network which collecting entity is configured to provide or collect the required vehicle-related parameter.

Furthermore, it stores which vehicle-related parameters can be provided and which corresponding collecting entity is configured to collect the vehicle-related parameter.

Furthermore, a method for operating a network data analytics entity is provided which operates as a collecting entity of the cellular network, wherein the network data analytics entity receives a subscription request comprising at least one vehicle-related parameter from a network exposure entity. The network data analytics entity then collects the information related to the at least one vehicle-related parameter and transmits a notification to the network exposure entity, wherein the notification comprises the information related to the at least one vehicle-related parameter.

Furthermore, the corresponding network data analytics entity is provided comprising a memory and at least one processing unit, the memory contains instructions executable by the at least one processing unit, wherein the network data analytics entity is configured to operate as discussed above or as discussed in further detail below.

As an alternative, a network data analytics entity is provided comprising a first module configured to receive a subscription request from the network exposure entity comprising at least one vehicle-related parameter. The data analytics entity comprises a second module which collects information related to the at least one vehicle-related parameter. A third module is configured to transmit a notification to the network exposure entity, wherein the notification comprises the information related to the at least one vehicle-related parameter. Here the network data analytics entity operates as collecting entity which collects the vehicle-related information.

Additionally, a system is provided comprising at least two of the above-mentioned entities, accordingly two entities selected from the group comprising the network data analytics entity, the subscriber database, the user equipment, and the network exposure entity.

Furthermore, a computer program comprising program code to be executed by at least one processing unit of the network exposure entity, the user equipment, the subscriber database or the network data analytics entity, where an execution of the program code causes the at least one processing unit to carry out a method as discussed above or as explained in further detail below.

It is to be understood that the features mentioned above and features yet to be explained below can be used not only in the respective combinations indicated, but also in other combinations or in isolation without departing from the scope of the present invention.

DETAILED DESCRIPTION OF DRAWINGS

The foregoing and additional features and effects of the application will become apparent from the following detailed description when read in conjunction with the accompanying drawings in which like reference numerals refer to like elements.

DETAILED DESCRIPTION OF EMBODIMENTS

Figure 1:
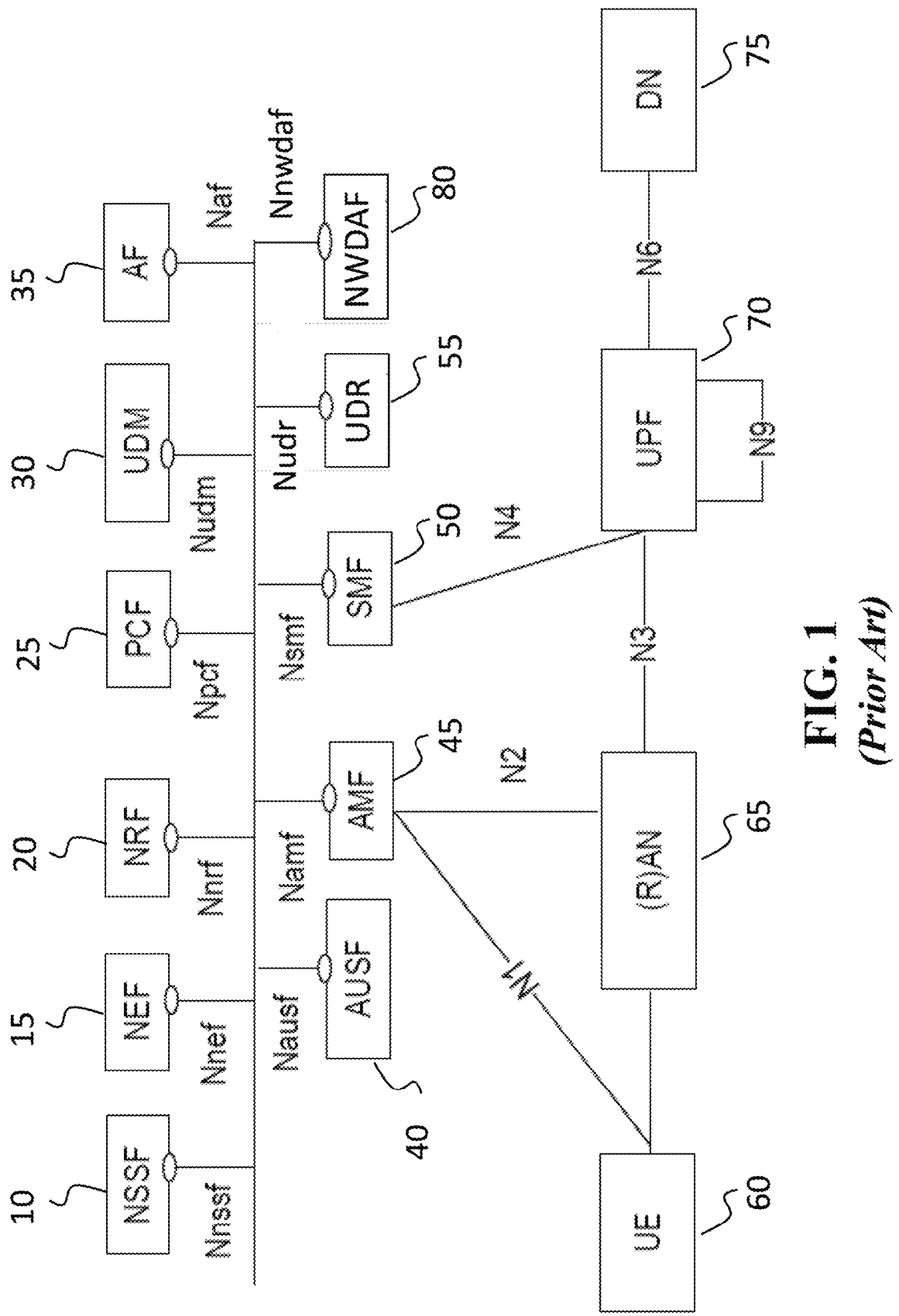
FIG. 1 shows a schematic view of the network architecture of a 5G network in a non-roaming example which includes entities relevant for the invention, wherein the architecture is known in the art.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are to be illustrative only.

The drawings are to be regarded as being schematic representations, and elements illustrated in the drawings are not necessarily shown to scale. Rather, the various elements are represented such that their function and general purpose becomes apparent to a person skilled in the art. Any connection or coupling between functional blocks, devices, components of physical or functional units shown in the drawings and described hereinafter may also be implemented by an indirect connection or coupling. A coupling between components may be established over a wired or wireless connection. Functional blocks may be implemented in hardware, software, firmware, or a combination thereof.

Within the context of the present application, the term "mobile entity" or "user equipment" (UE) refers to a device for instance used by a person (i.e. a user) for his or her personal communication. It can be a telephone type of device, for example a telephone or a Session Initiating Protocol (SIP) or Voice over IP (VOIP) phone, cellular telephone, a mobile station, cordless phone, or a personal digital assistant type of device like laptop, notebook, notepad, tablet equipped with a wireless data connection. The UE may also be associated with non-humans like animals, plants, or machines. A UE may be equipped with a SIM (Subscriber Identity Module) or electronic-SIM comprising unique identities such as IMSI (International Mobile Subscriber Identity), TMSI (Temporary Mobile Subscriber Identity), or GUTI (Globally Unique Temporary UE Identity) associated with the user using the UE. The presence of a SIM within a UE customizes the UE uniquely with a subscription of the user.

For the sake of clarity, it is noted that there is a difference but also a tight connection between a user and a subscriber. A user gets access to a network by acquiring a subscription to the network and by that becomes a subscriber within the network. The network then recognizes the subscriber (e.g. by IMSI, TMSI or GUTI or the like) and uses the associated subscription to identify related subscriber data. A user is the actual user of the UE, and the user may also be the one owning the subscription, but the user and the owner of the subscription may also be different. E.g. the subscription owner may be the parent, and the actual user of the UE could be a child of that parent.

In the following, a solution will be discussed which addresses the problems indicated in the introductory part. It especially addresses the activation or deactivation of collection of information related to a vehicle per an external entity on-demand. The proposed solution provides a service extension with new parameters related to expose automotive information, especially for the network exposure entity or for the network data analytics entity. Furthermore, a user equipment or UE provides a new service which can report the corresponding information.

A method is provided to publish automotive information requested by an application function. Accordingly, the application function can request specific information on-demand from a vehicle.

In the following, the terms functions and entities are used interchangeably so that the network exposure entity may be indicated as network exposure function, or the network data analytics entity may be indicated as network data analytics function etc.

As will be discussed below, the method comprises different steps such as the application function asks a network exposure function for the needed vehicle-related parameters. The network exposure function then asks a subscriber database if the parameters for the user equipment or the vehicle in which the user equipment is located, can be provided to the application function or not. Furthermore, the network exposure function asks the subscriber database which node or which collecting entity can provide the needed parameter.

The subscriber database then answers which node can provide the needed information. Based on this information the network exposure function can subscribe to the corresponding node for obtaining this vehicle-related parameter and when the corresponding subscription data is received the network exposure entity exposes this information to the application function as required.

Figure 2:
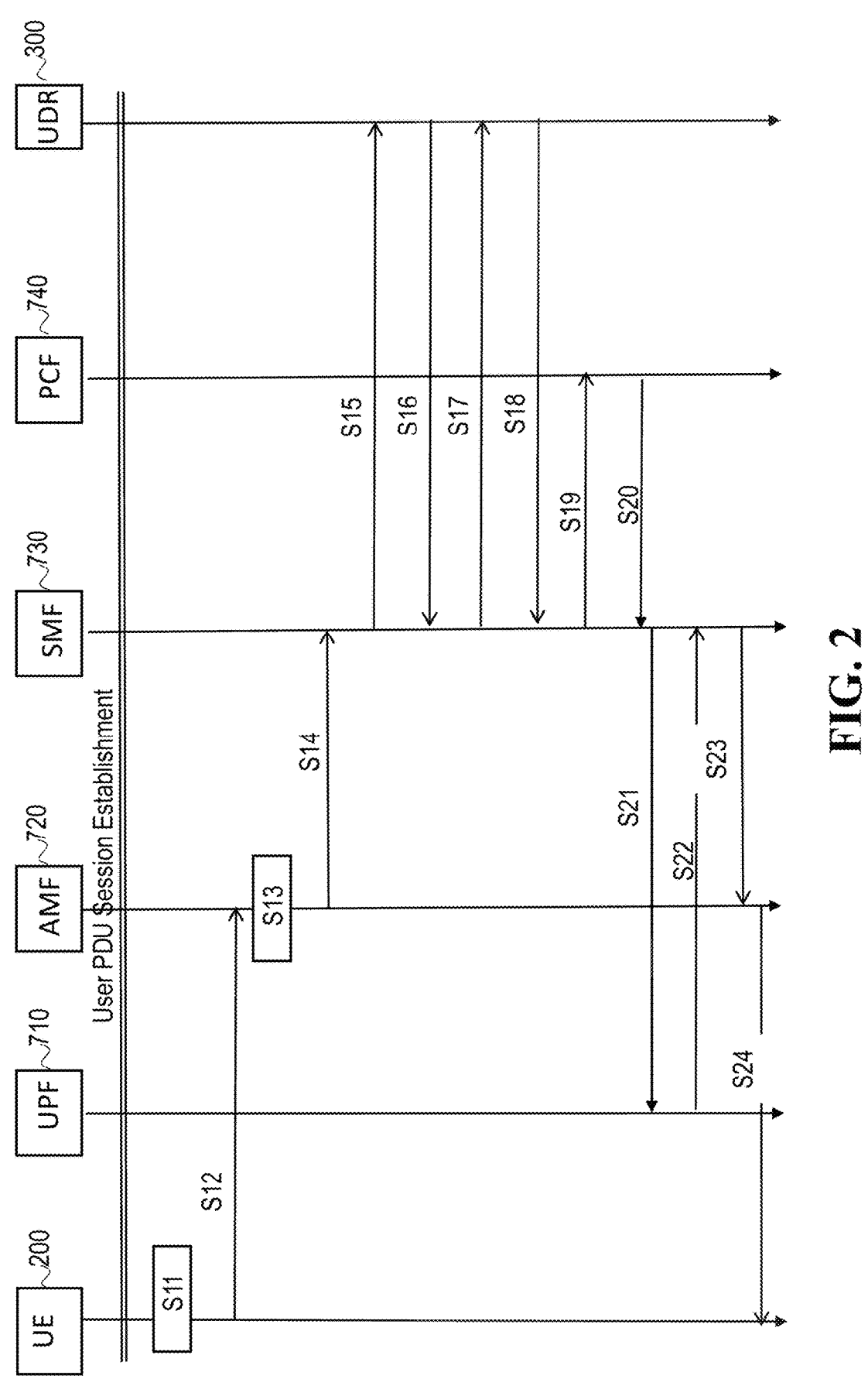
FIG. 2 shows a schematic view of a message exchange in a registration phase of how vehicle-related information can be provided.

In FIG. 2, it is described how a vehicle can provide information in the registration phase. FIG. 2 describes in more detail how automotive information or vehicle-related information can be provided, wherein FIG. 2 focuses on the registration phase.

S11. The UE provides a communication channel to subscribe to events

S12. Subscriber (vehicle) triggers PDU Session Establishment including a list of parameters that it can expose like for example, speed or passenger capacity. The vehicle includes a communication channel for exposing this information where an external entity can ask the vehicle for some services. The communication channel is the port where UE (vehicle) exposes its information.

S13. The AMF selects the SMF.

S14. AMF sends the previous request to SMF 730, including information of step S11.

S15. SMF 720 registers those parameters in the user profile of this subscriber in UDR (User Data Repository), including information of step S14. Information is:

a. List of parameters b. Communication Channel

S16. UDR 300 positively answers information registration from previous step.

S17. SMF 730 asks for subscription profile information to UDR 300.

S18. UDR 300 sends subscription profile information to SMF 730. It includes the Communication Channel.

S19. SMF 730 establishes an association with PCF.

S20. PCF 740 answers correctly SMF.

S21. SMF 730 establishes and selects a connection towards UPF.

S22. UPF 710 answers correctly to SMF request.

S23. SMF 730 answers with AMF request of step S14.

S24. AMF 720 answers the request of step S12.

A possible implementation of FIG. 2 is as follows:

S12: PDU Session Establishment Request (Car [SUPI/SUCI] Communication Channel [speed passenger capacity etc.])

S14: Nsmf PDU Session Create (Car [SUPI/SUCI] Communication Channel list of parameters [speed passenger capacity etc.])

S15: Nudr UECM Registration_Request (Car [SUPO/SUCI] Communication Channel list of parameters [speed passenger capacity etc.])

S16: Nudr UECM Registration_Response

S17: Nudr Get Session Management Subscription Data (Car [SUPI/SUCI])

S18: Nudr Session Management Subscription Data (200, Communication Channel)

S19: Npcf_SMPolicyControl_CreateRequest

S20: Npcf_SMPolicyControl_CreateResponse PCC Rule (PDR, FAR, QER, URR)

S21: PFCP Session Establishment Request (PDR, FAR, QER, URR)

S22: PFCP Session Establishment Response

S23: Nsmf PDU Session Create Response

S24: PDU Session Establishment Request Response

Figure 3:
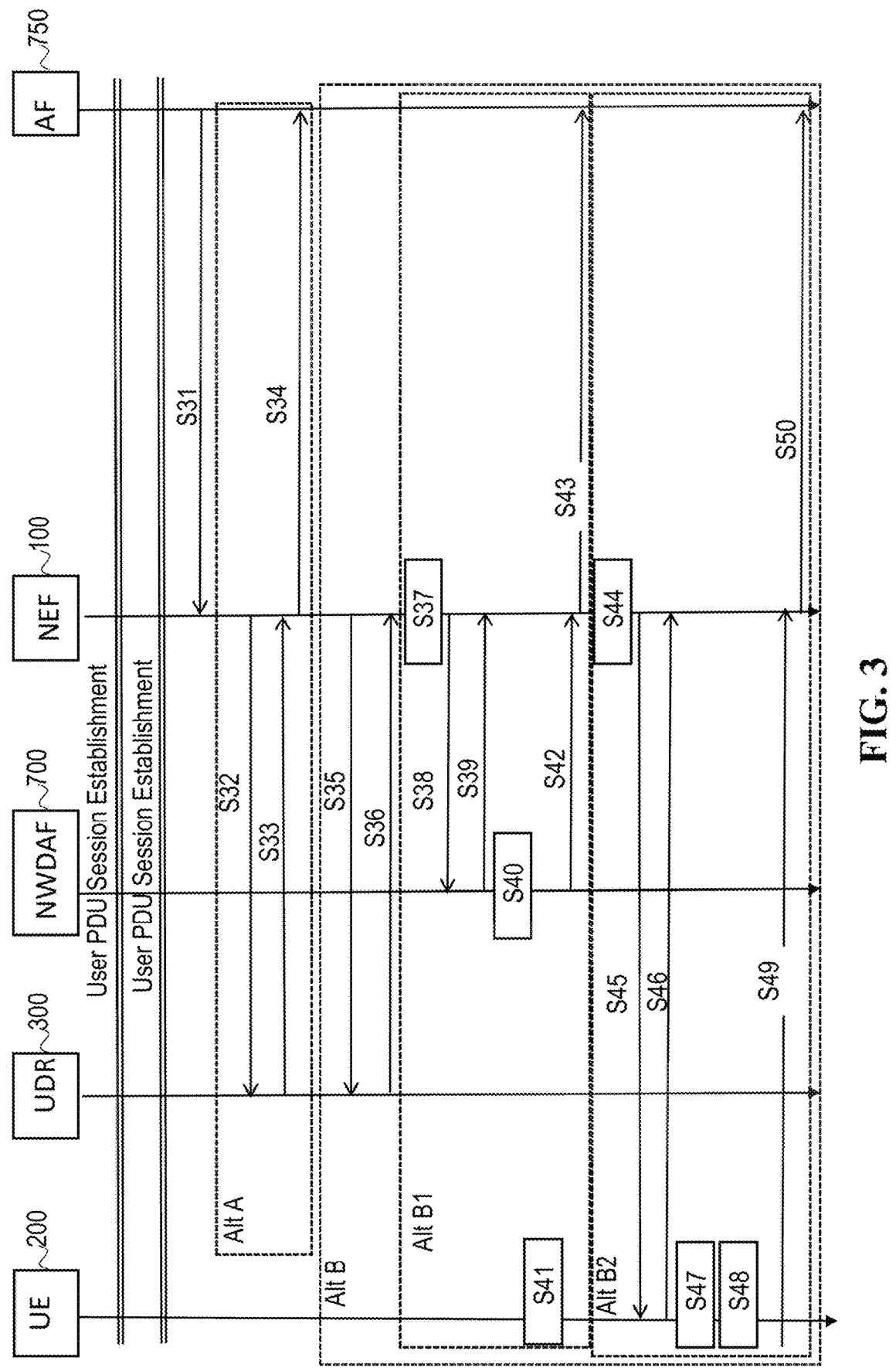
FIG. 3 shows a schematic view of a message exchange of how an external entity can request vehicle-related information in a generic use case.

In FIG. 3, a generic use case is discussed in more detail.

In the situation shown, the vehicle has a PDU session established. Optionally, the vehicle has included list of parameters according what is defined in FIG. 1.

S31. AF 750 requests to NEF 100 those parameters that must be analyzed using Nnef_EventExposure. Including the following information a. Car identified with SUCI/SUPI b. Parameter that it is requested, c. Parameter limit S32. NEF 100 asks to UDR 300 which node (network node or UE) can provide this parameter information.

S33. UDR 300 informs that any nodes cannot provide this information.

S34. NEF 100 informs to AF 750 that cannot provide the information requested in Step S31.

Steps S32-S34 (alternative A) explain when NEF 100 cannot provide information requested in Step S31.

S35. NEF asks to UDR which node can provide this parameter information.

Steps S37-S42 (alternative B1) explain when NEF subscribes to information of NWDAF.

S36. UDR 300 informs which node can provide the information. It can be NWDAF 700 or UE 200, in case of UE it provides the communication channel towards UE.

S37, S38. In case in step S36 UDR answers with NWDAF node, NEF subscribes to event exposure service provided by NWDAF including parameter, limit of the parameter and the subscriber information.

S39, S40. NWDAF 700 answers positively to request of step S38 and starts analyzing this parameter.

S41. Once UE 200 (vehicle) is up to the limit sent in step S38. NWDAF 700 notifies to NEF 100 about it (S42).

S43. NEF 100 informs to AF about it.

S44. In case in step S36, UDR 300 answers with UE (Alternative B2), NEF 100 subscribes to a new event exposure service of UE (S45). It includes the parameter, the limit of the parameter and the AF information (optionally).

S46. UE 200 answers positively to request of step S44 and starts analyzing this parameter (S47).

S47, S48. In case UE 200 is up to the limit defined sent in step S44, UE 200 notifies to NEF 100 (S49).

S50. NEF 100 informs to AF 750 about it.

A possible implementation of FIG. 3 is as follows:

S31: Nnef_EventExposure_Request (UE ID Event-Id=Parameter, Event-Trigger=Parameter limit)

S32: Get parameter Request (Parameter)

S33: Get parameter Response (NOT OK)

S34: Nnef_EventExposure_Response (UE ID Event-Id=Parameter, Event-Trigger=Parameter limit NOT OK)

S35: Get parameter Request (Parameter)

S36: Get parameter Response (OK. NF=[NWDAF|UE]. Optional=Communication Channel)

S38: Nnwdaf_EventExposure_Request (UE ID, AF Event-Id=Parameter, Event-Trigger=Parameter limit)

S39: Nnwdaf_EventExposure_Response (OK)

S42: Nnwdaf_EventExposure_Notify (UE ID, Event-Id=Parameter, Event-Trigger=Parameter limit)

S43: Nnef_EventExposure_Notify (UE ID, Event-Id=Parameter, Event-Trigger=Parameter limit)

S45: Nue_EventExposure_Request (UE ID, AF Event-Id=Parameter, Event-Trigger=Parameter limit)

S46: Nue_EventExposure_Response (OK)

S49: Nue_EventExposure_Notify (UE ID, Event-Id=Parameter, Event-Trigger=Parameter limit)

S50: Nnef_EventExposure_Notify (UE ID, Event-Id=Parameter, Event-Trigger=Parameter limit)

Figure 4:
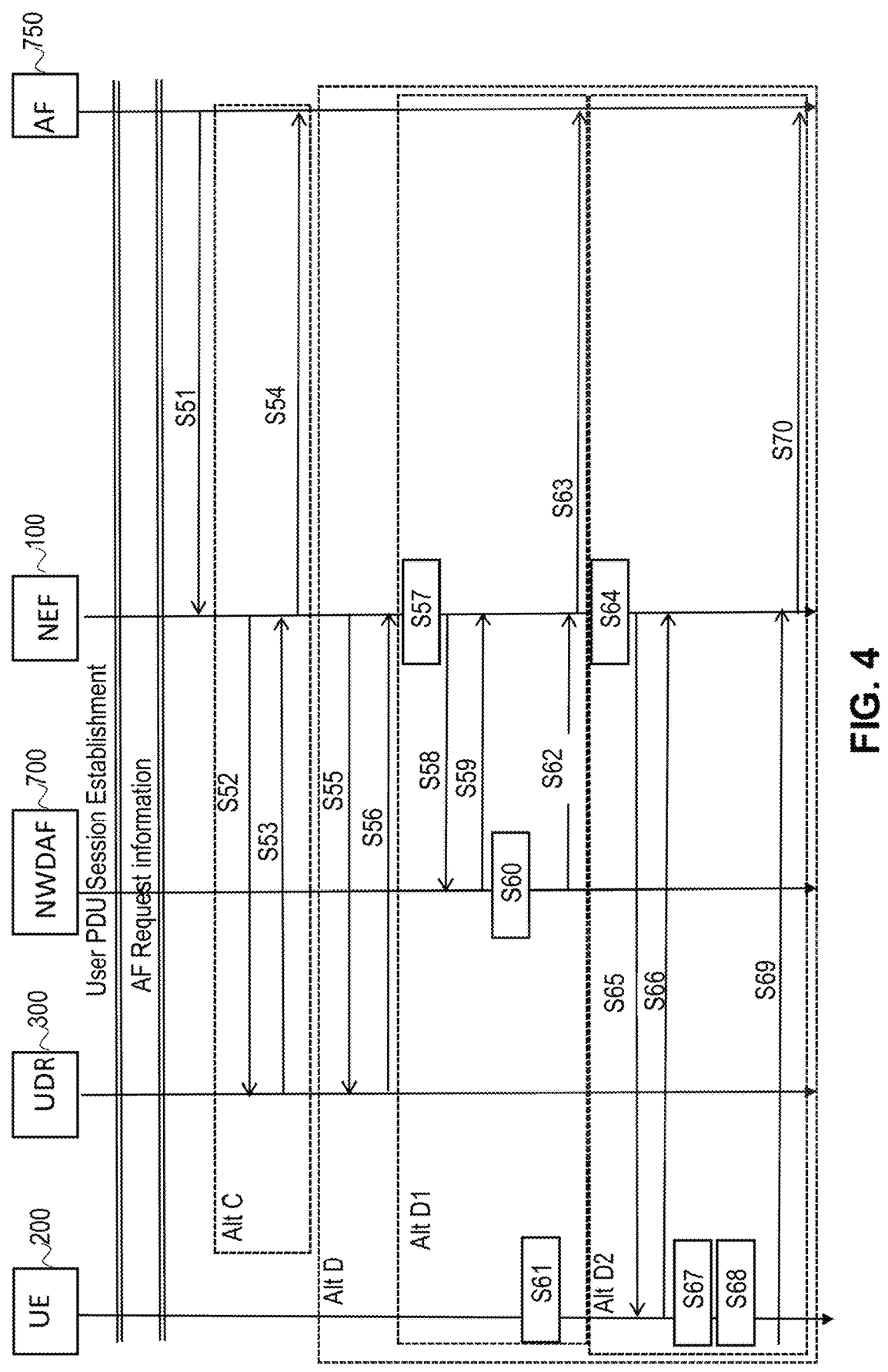
FIG. 4 shows a schematic view of a message exchange of FIG. 3 when vehicle speed information is requested.

FIG. 4 is an example of FIG. 3 where traffic police requests speed information of a car and they want to know when this speed is over 120 km/h.

In the example shown, the vehicle has a PDU session establishment. Optionally, the vehicle has included list of parameters according what is defined in FIG. 1.

S51. AF 750 requests to NEF 100 those parameters that must be analyzed. Including the following information a. Car identified with SUCI/SUPI b. Parameter that it is requested, speed c. Parameter limit-speed over 120 km S52. NEF 100 asks to UDR 300 if network can provide this parameter information (speed).

S53. UDR 300 informs that network cannot provide this information (speed).

S54. NEF 100 informs to AF 750 that cannot provide the information requested in Step S51.

Step S52-S54 (Alternative C) is explaining when NEF cannot provide the requested information.

S55. NEF asks to UDR if any network node can provide this parameter information (speed) (Alternative D).

S56. UDR 300 informs which node can provide the information. It can be NWDAF or UE, in case of UE it provides the communication channel towards UE. In this case it informs that both nodes can provide the information.

S57, S58. In case in step S56, UDR answers with NWDAF node (Alternative D1), NEF subscribes to event exposure of this parameter (speed) to NWDAF. It includes the limit of the parameter (speed over 120) and the subscriber information.

S59. NWDAF 700 answers positively to request of step S58 and starts analyzing this parameter (S60).

S61. Once UE (vehicle) is up to the limit (speed over 120 km/h) sent in step S58. NWDAF notifies the NEF about it (S62).

S63. NEF 100 informs the AF that the UE is up to 120 km/h.

S64. In case in step S56, UDR answers with UE (Alternative D2), NEF subscribes to event exposure of this parameter to UE (S65). It includes the limit of the parameter (speed over 120 km/h) and the AF information (police department).

S66. UE answers positively to request of step S64 and starts analyzing this parameter (speed) (S67).

S68. In case UE is up to the defined limit sent in step S64 (speed over 120 km/h), UE notifies NEF accordingly (S69).

S70. NEF informs AF about it.

A possible implementation of FIG. 4 is as follows:

S51: Nnef_EventExposure_Request (UE ID Event-Id=Parameter=Speed, Event-Trigger=Parameter limit=over 120 km/h)

S52: Get parameter Request (Parameter)

S53: Get parameter Response (NOT OK)

S54: Nnef_EventExposure_Response (UE ID Event-Id=Parameter, Event-Trigger=Parameter limit NOT OK)

S55: Get parameter Request (Parameter=Speed)

S56: Get parameter Response (OK, NF=[NWDAF|UE] Communication channel)

S58: Nnwdaf_EventExposure_Request (UE ID, AF=Police Event-Id=Parameter=Speed, Event-Trigger=Parameter limit=over 120 km/h)

S59: Nnwdaf_EventExposure_Response (OK)

S62: Nnwdaf_EventExposure_Notify (UE ID, AF=Police Event-Id=Parameter=Speed, Event-Trigger-Parameter limit=over 120 km/h)

S63: Nnef_EventExposure_Notify (UE ID Event-Id=Parameter=Speed, Event-Trigger=Parameter limit=over 120 km/h)

S65: Nue_EventExposure_Request (UE ID, optional AF=Police Event-Id=Parameter, Event-Trigger=Parameter limit)

S66: Nue_EventExposure_Response (OK)

S69: Nue_EventExposure_Notify (UE ID optional AF=Police Event-Id=Parameter=Speed, Event-Trigger=Parameter limit=over 120 km/h)

S70: Nnef_EventExposure_Notify (UE ID Event-Id=Parameter=Speed, Event-Trigger-Parameter limit=over 120 km/h)

Figure 5:
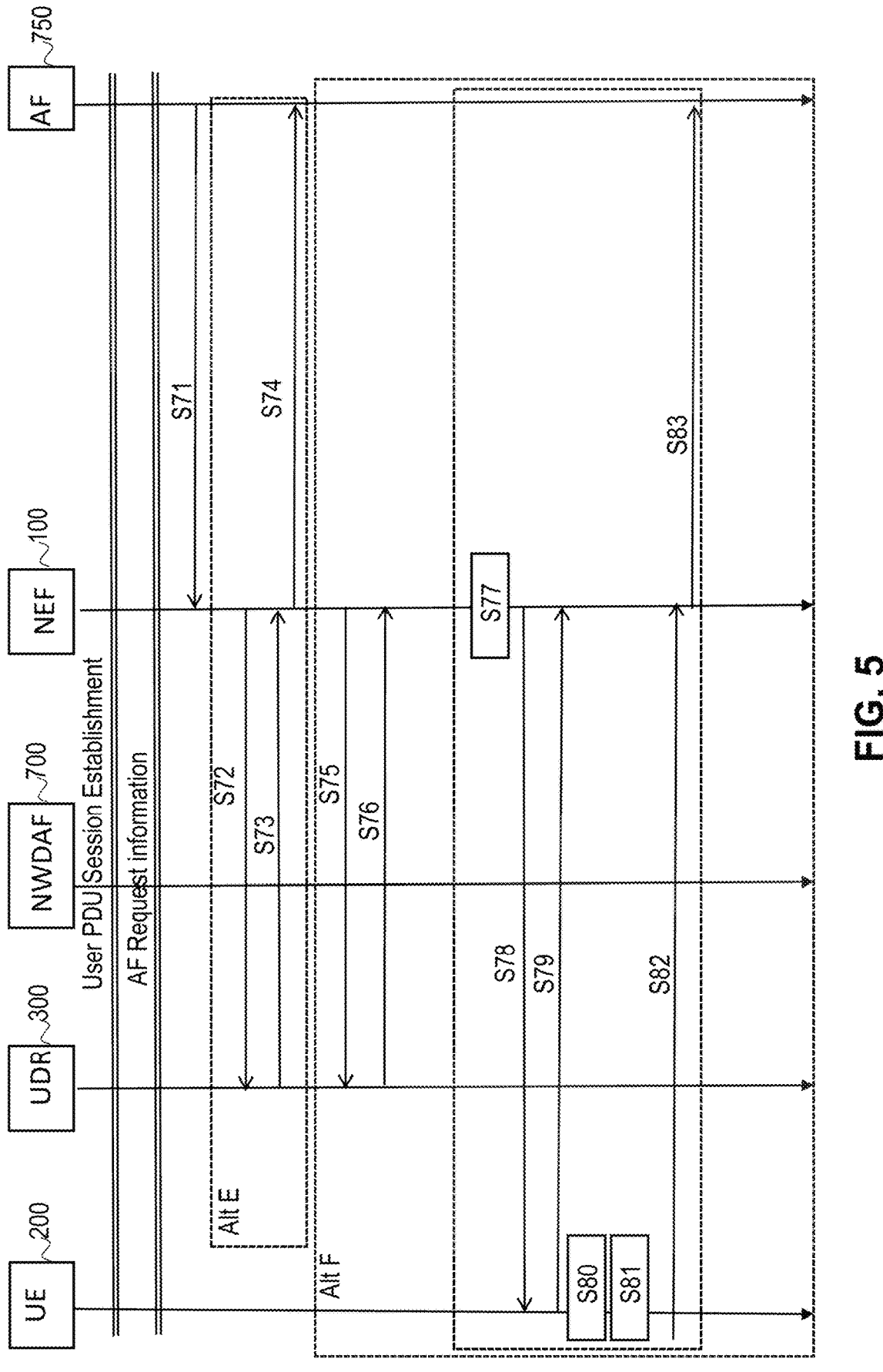
FIG. 5 shows a schematic view of a message exchange of FIG. 3 in the example of a vehicle occupancy as vehicle-related parameter.

FIG. 5 is an example of FIG. 3 where only UE can provide the needed information, i.e. occupancy. In this particular case, the AF interested in this information is the telepass who can apply discounts according the occupancy of vehicles.

Here the vehicle has a PDU session establishment. Optionally, the vehicle has included list of parameters according what is defined in FIG. 1.

S71. AF 750 requests to NEF those parameters that must be analyzed. Including the following information a. Car identified with SUCI/SUPI b. Parameter that it is requested (occupancy)

c. Parameter limit (car over two passengers)

S72. NEF asks to UDR if network can provide this parameter information.

S73. UDR informs that network cannot provide this information.

S74. NEF informs to AF that cannot provide the information requested in Step S71 (Alternative E).

S75. NEF asks to UDR if network can provide this parameter information (Alternative F).

S76. UDR 300 informs which node can provide the information. In this case only UE can provide occupancy of car and it provides the communication channel towards UE.

S77. NEF subscribes to event exposure of this occupancy parameter to UE. It includes the limit of the parameter (over 2 passengers) and the AF information (Telepass) (S78).

S79. UE answers positively to request of S77 and starts analyzing this parameter (S80).

S81. In case UE is up to two passengers, UE notifies the NEF (S82).

S83. NEF informs AF about it.

A combination of information from NWDAF and UE is also possible. It is pay as you drive whose AF (insurance car), where NWDAF can track UE position while UE can inform about the speed of the UE.

A possible implementation of FIG. 5 is as follows:

S71: Nnef_EventExposure_Request (UE ID Event-Id=Parameter=Occupancy Event-Trigger=Parameter limit=over 2 passengers)

S72: Get parameter Request (Parameter=Occupancy)

S73: Get parameter Response (NOT OK)

S74: Nnef_EventExposure_Response (UE ID Event-Id=Parameter=Occupancy Event-Trigger=Parameter limit=over 2 passengers NOT OK)

S75: Get parameter Request (Parameter=Occupancy)

S76: Get parameter Response (OK, NF=[UE], Communication Channel)

S78: Nue_EventExposure_Request (UE ID, optional AF=Telepass Event-Id=Parameter=Occupancy Event-Trigger=Parameter limit=over 2 passengers)

S79: Nue_EventExposure_Response (OK)

S82: Nue_EventExposure_Notify (UE ID, optional AF=Telepass Event-Id=Parameter=Occupancy Event-Trigger=Parameter limit=over 2 passengers)

S83: Nnef_EventExposure_Notify (UE ID Event-Id=Parameter=Occupancy Event-Trigger=Parameter limit=over 2 passengers)

Figure 6:
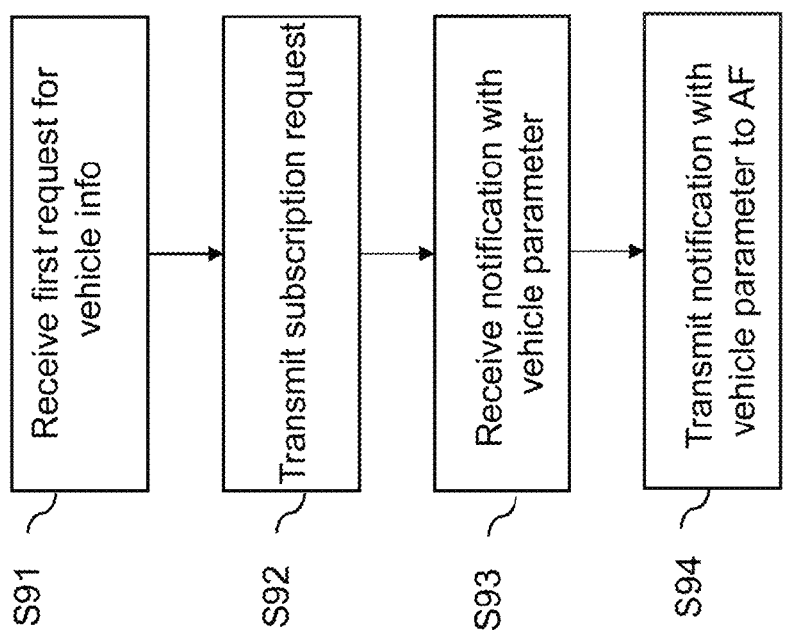
FIG. 6 shows a schematic flowchart of a method carried out by a network exposure entity in the message exchange shown in FIGS. 2 to 5.

FIG. 6 summarizes the steps carried out by the network exposure entity in the embodiments discussed above. In step S91, the network exposure entity receives a first request from the application entity requesting vehicle-related information as discussed above in connection with step S31. The information comprises a vehicle identifier and at least one vehicle-related parameter. Furthermore, the network exposure entity transmits in step S92 a subscription request to a collecting entity which is configured to collect the vehicle-related information. This subscription request comprises at least the vehicle-related parameter. This was discussed above in more detail in steps S38 or S45 depending on the fact whether the collecting entity is the user equipment or the network data analytics entity. In step S93, the network exposure entity receives the notification from the collecting entity in response to the subscription which comprises the information related to the at least one vehicle-related parameter. This was discussed above in steps S42 or S49 depending on the fact which collecting entity transmits the requested information. Furthermore, in step S94 a notification is transmitted to the application entity comprising the vehicle identifier and the information related to the at least one vehicle-related parameter as discussed above in step S43 or S50.

Figure 7:
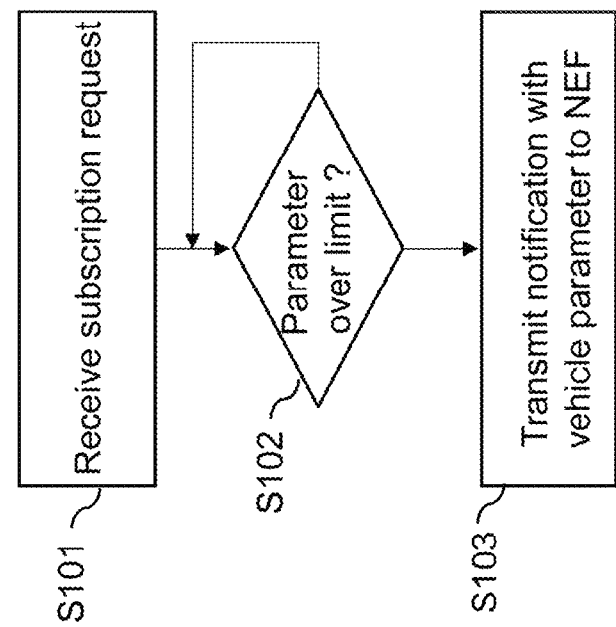
FIG. 7 shows a schematic flowchart of a method carried out by a user equipment in a message exchange shown in FIGS. 2 to 5.

FIG. 7 summarizes some of the steps carried out by the user equipment 200 in the different examples discussed above. In step S101, the user equipment receives the subscription request comprising the at least one vehicle-related parameter, wherein the subscription request is received from the network exposure entity. This was discussed above in connection with step S45. The user equipment or UE then monitors the at least one vehicle-related parameter in step S102 or as discussed above in connection with steps S47 and S48 and transmits a notification to the network exposure entity which comprises the information related to the at least one vehicle-related parameter. This step S103 in the embodiment shown is transmitted when the parameter is over the limit which was also received together with the subscription request. This was discussed above in connection with step S49 in further detail.

The steps discussed in connection with FIG. 7 may also be carried out by the network data analytics entity. Here the first step was discussed above in connection with step S38, the collecting step was discussed in connection with step S40 and S41 and the transmitting step was discussed above in connection with step S42.

Figure 8:
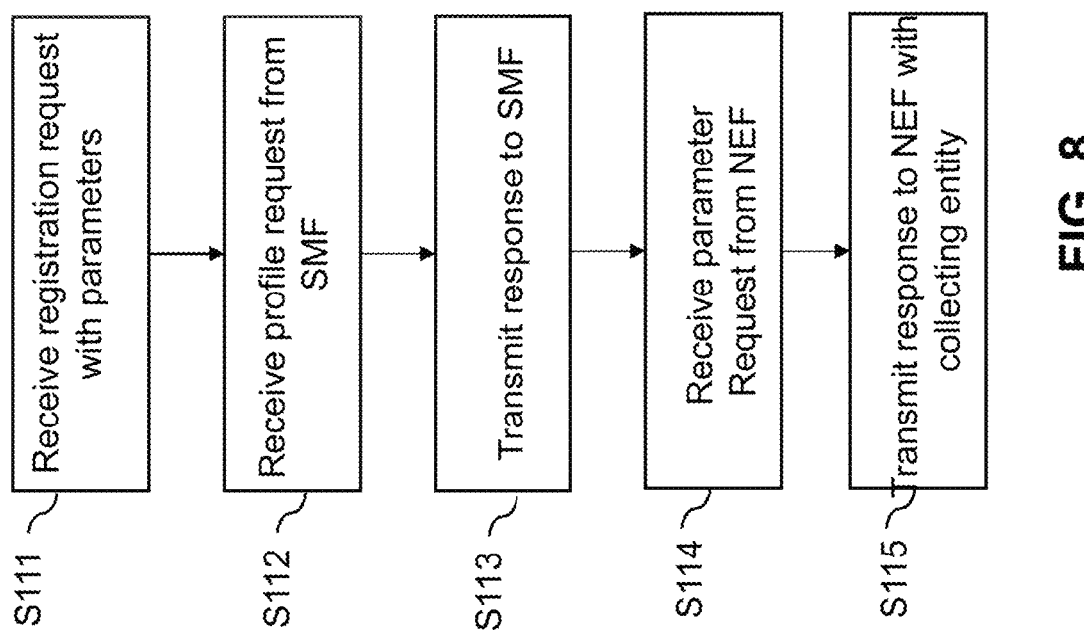
FIG. 8 shows a schematic flowchart of a method carried out by a subscriber database in a message exchange as shown in FIGS. 2 to 5.

FIG. 8 summarizes the steps carried out by the subscriber database in connection with the examples mentioned above. In a step S111, the subscriber database receives a registration request from a session control entity for a user equipment connected to a vehicle, wherein this registration request comprises vehicle-related parameters and a communication channel where each of the parameters is exposed. The communication channel also identifies the collecting entity such as the UE or the network data analytics entity which is configured to collect the requested vehicle-related parameter. In step S112, the subscriber database receives a profile request from the session control entity for a subscriber profile of the user equipment as discussed above in connection with step S17. In step S113, the subscriber database transmits a response to the session control entity in response to the received request, wherein this response comprises the communication channel and thus the information about the collecting entity. This was discussed above in connection with step S18. In step S114, a request is received from a network exposure entity requesting which collecting entity is configured to collect one or several of the vehicle-related parameters. This was discussed above in connection with step S32 above. In the next step S115, the subscriber database transmits a response to the network exposure entity, wherein this response comprises an identifier of the collecting entity which is configured to collect the needed vehicle-related parameter. This was discussed above in connection with step S33.

Figures 9, 10:
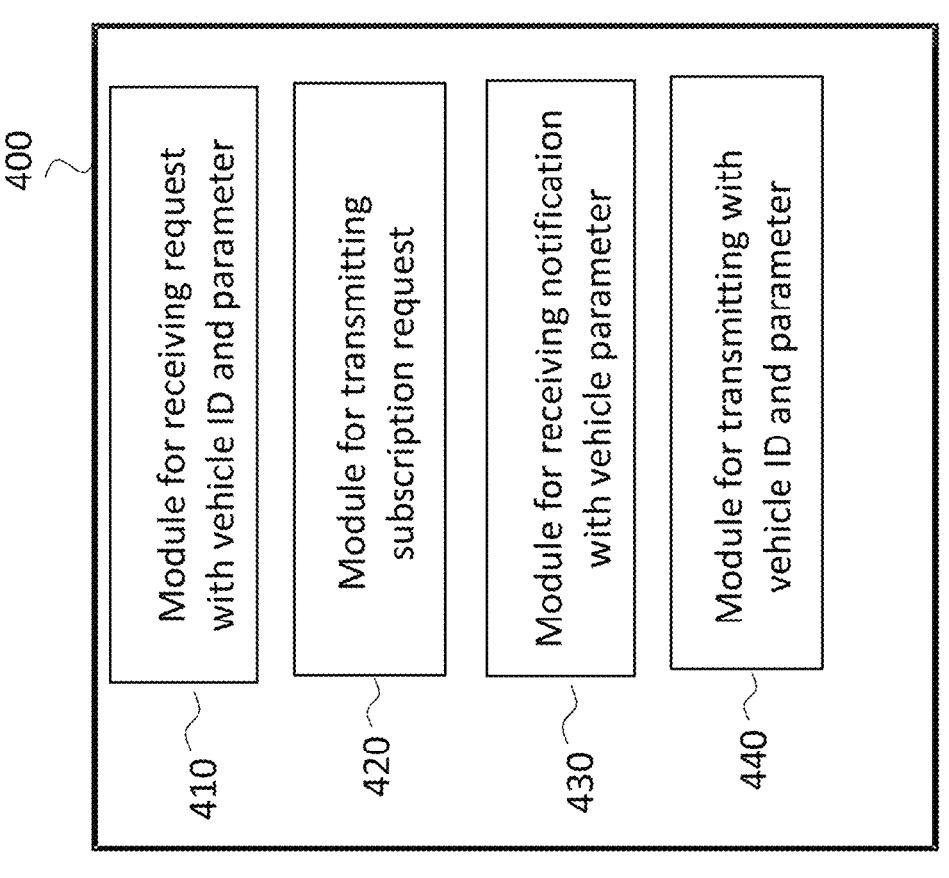
FIG. 9 shows an example schematic representation of a network exposure entity configured to operate as discussed in connection with FIGS. 2 to 5.
FIG. 10 shows another example schematic representation of a network exposure entity configured to operate as discussed in connection with FIGS. 2 to 5.

FIG. 9 shows a schematic architectural view of a network exposure entity 100 which can carry out the above discussed steps. The network exposure entity 100 comprises an interface 110 configured to receive user data or control messages from other entities and configured to transmit user data or control messages to other entities. The network exposure entity is especially configured to transmit and receive the messages discussed in connection with FIG. 6. The network exposure entity furthermore comprises a processing unit 120 which is responsible for the operation of the entity 100. The processing unit 120 comprises one or more processors and can carry out instructions stored on a memory 130, wherein the memory may include a read-only memory, a random access memory, a mass storage, a hard disk or the like. The memory can furthermore include suitable program code to be executed by the processing unit 120 so as to implement the above-described functionalities in which the network exposure entity 100 is involved.

FIG. 10 shows another schematic architectural view of a network exposure entity comprising a first module 410 configured to receive the request requesting the vehicle-related information, wherein the request comprises the vehicle identifier and at least one parameter of the vehicle. A module 420 is configured to transmit a subscription request to a collecting entity such as the user equipment or the network data analytics entity, wherein this subscription request also comprises the at least one vehicle-related parameter. A module 430 is provided configured to receive a notification from the collecting entity in response to the subscription, wherein the response comprises information related to the vehicle-related parameter. A module 440 is provided configured to transmit a notification to the application entity comprising the vehicle identifier and the information related to the vehicle-related parameter.

Figure 11:
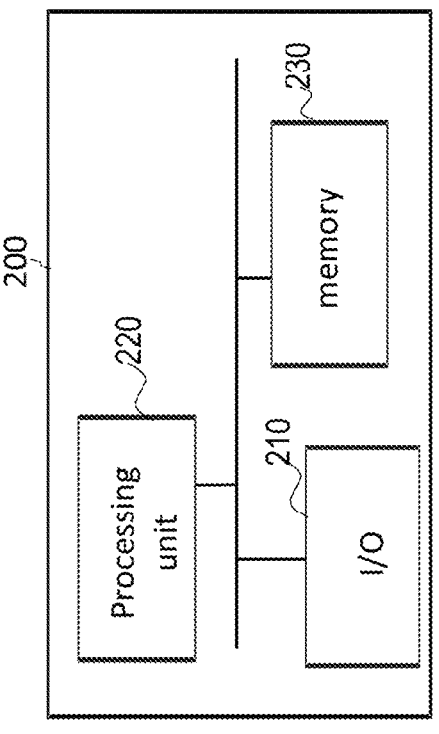
FIG. 11 shows an example schematic representation of a user equipment or of a network data analytics entity configured to operate as discussed in connection with FIGS. 2 to 5.

FIG. 11 shows a schematic architectural view of a collecting entity implemented as user equipment 200 which is connected to a cellular network and which can operate as discussed above in connection with FIGS. 2 to 8. The user equipment comprises an interface 210 configured to transmit user data or control messages to other entities and configured to receive user data or control messages from other entities. The interface is especially configured to transmit and receive the data as discussed in connection with FIG. 7. The user equipment 200 furthermore comprises a processing unit 220 which is responsible for the operation of the user equipment 200. The processing unit 220 comprises one or more processors and can carry out instructions stored on a memory 230, wherein the memory may include a read-only memory, a random access memory, a mass storage, a hard disk or the like. The memory can furthermore include suitable program code to be executed by the processing unit 220 so as to implement the above-described functionalities in which the user equipment is involved.

Figure 12:
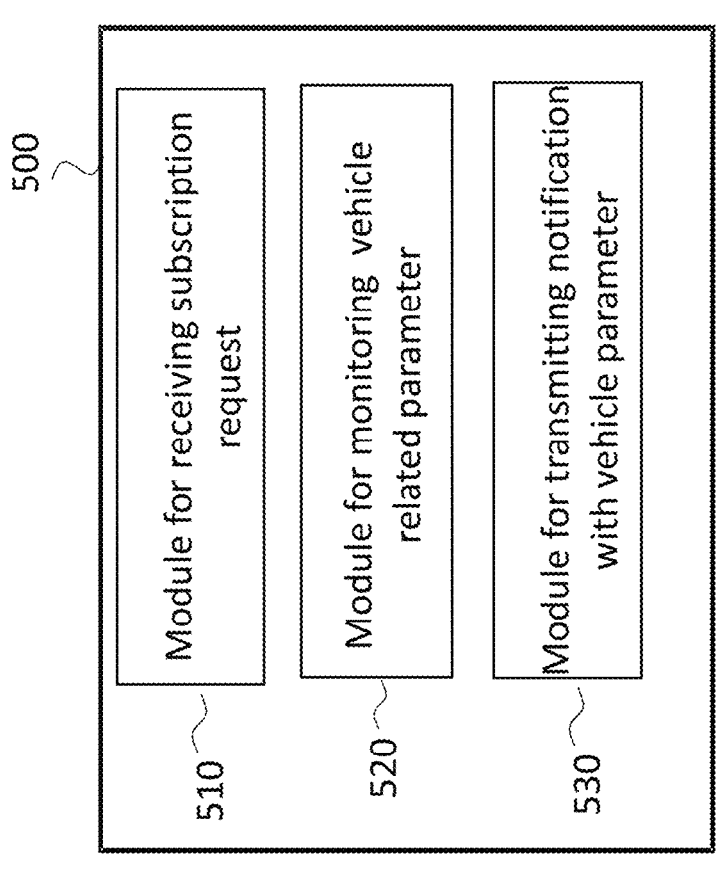
FIG. 12 shows another example schematic representation of a user equipment or of a network data analytics entity configured to operate as discussed in connection with FIGS. 2 to 5.

FIG. 12 shows another architectural view of a collecting entity implemented as user equipment or network data analytics entity 500 comprising a first module 510 configured to receive the subscription request. A second module 520 is provided configured to monitor the at least one vehicle related-parameter and a module 530 is provided configured to transmit a notification to the network exposure entity, wherein this notification comprises information related to the at least one vehicle-related parameter. Instead of the user equipment the entity 500 can also be implemented in a network data analytics entity. This depends on the fact which of the two entities is configured to collect the required information. Accordingly, entity 500 is the collecting entity which collects the vehicle-related information based on the received subscription request and the collecting entity may be implemented as a user equipment or a network data analytics entity.

Figure 13:
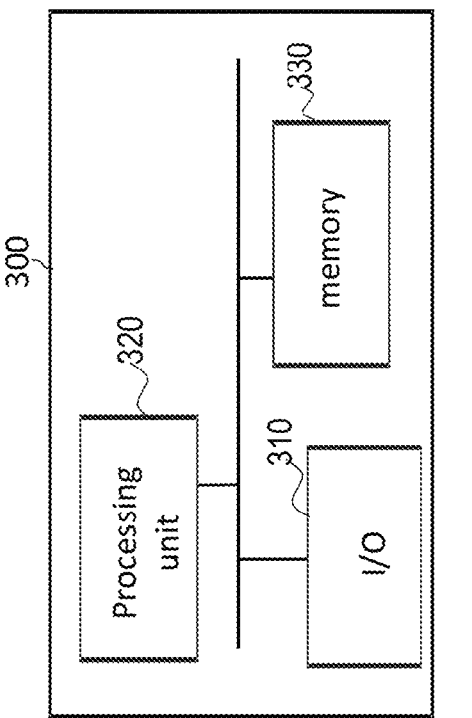
FIG. 13 shows an example schematic representation of a subscriber database configured to operate as discussed in connection with FIGS. 2 to 5.

FIG. 13 shows a schematic architectural view of a subscriber database 300 which can operate as discussed above in connection with FIGS. 2 to 8. The subscriber database comprises an interface 310 which is configured to transmit user data or control messages and configured to receive user data and control messages from other entities. The interface 320 may be especially configured to transmit and receive the messages discussed above in connection with FIG. 8. The subscriber database furthermore comprises a processing unit 320 which is responsible for the operation of the subscriber database 300. The processing unit 320 comprises one or more processors and can carry out instructions stored on a memory 330. The memory may include a read-only memory, a random access memory, a mass storage, a hard disk or the like. The memory can furthermore include suitable program code to be executed by the processing unit 320 so as to implement the above described functionalities in which the subscriber database is involved.

Figure 14:
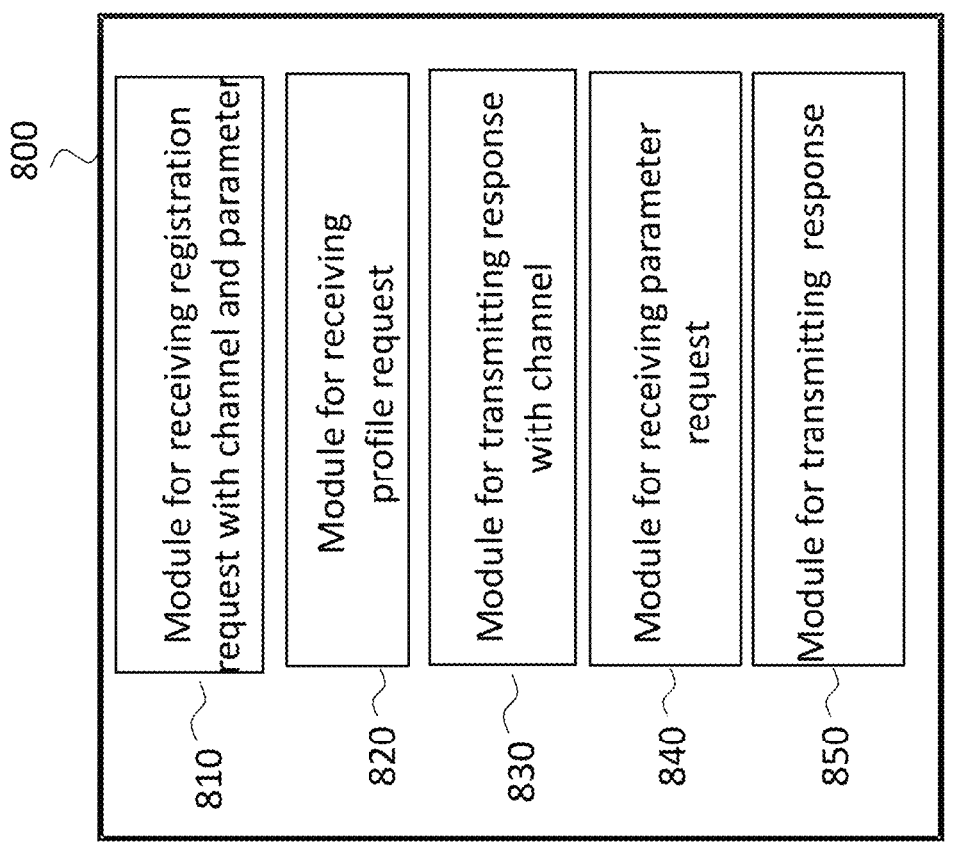
FIG. 14 shows another example schematic representation of a subscriber database configured to operate as discussed in connection with FIGS. 2 to 5.

FIG. 14 shows another schematic architectural view of a subscriber database comprising a first module 810 configured to receive the registration request which comprises the vehicle-related parameters and the corresponding communication channels where each of the parameters can be retrieved. A second module 820 is provided configured to receive a profile request requesting a subscription profile of the user equipment. A third module 830 is provided configured to transmit a response to the session control entity in response to the profile request, wherein the response comprises the communication channel. A module 840 is provided configured to receive a request requesting which collecting entity can collect the required vehicle-related parameter. A module 850 is provided configured to transmit a response in response to the received request wherein this response comprises the identifier for the collecting entity.

From the above-said some general conclusions can be drawn:

As far as the network exposure entity is concerned, the network exposure entity furthermore may transmit a request to a subscriber database of the cellular network which asks the subscriber database which entity is configured to operate as collecting entity. Furthermore, it may receive a response message from the subscriber database, wherein this response message comprises a collecting entity identifier which allows the collecting entity to be identified. The subscription request is then transmitted based on the collecting entity identifier. These two steps were discussed above in connection with step S35 or S36.

It is possible that the at least one vehicle-related parameter received in the request further comprises a parameter limit, wherein the first request requests that the application entity be informed of the at least one vehicle-related parameter when the parameter limit is reached. The subscription request also comprises the at least one parameter limit.

This subscription request may be transmitted to the user equipment or to the network data analytics entity as mentioned above in steps S38 or S45, wherein those entities operate as collecting entity.

The vehicle-related parameter can be a vehicle speed, a vehicle position, a distance a vehicle has travelled along a certain type of road or a number of passengers provided in the vehicle. Furthermore, it is possible that at least one of the first request received from the application entity and the subscription request is implemented as event exposure request as mentioned in step S31 or S38, S45.

As far as the user equipment is concerned, the subscription request received from the network exposure entity may comprise at least one parameter limit. The notification is transmitted to the network exposure entity when the at least one vehicle-related parameter has reached the at least one parameter limit.

Furthermore, it is possible that the user equipment transmits an establishment request to a mobility management entity of the cellular network, wherein this establishment request comprises an indication that vehicle information can be exposed outside the vehicle. The vehicle information comprises a vehicle identifier and the at least one vehicle-related parameter and a communication channel where the vehicle information is exposed. The notification may be only transmitted to the network exposure entity in response to the subscription request when the at least one vehicle-related parameter is present in the vehicle information.

As far as the network data analytics entity is concerned, the subscription request received may comprise at least one parameter limit and the notification is transmitted to the network exposure entity when the at least one vehicle-related parameter has reached the at least one parameter limit.

The solution discussed above allows an application function to retrieve information from vehicles using information directly from the vehicle or the user equipment in the vehicle or the network data analytics entity. When the vehicle speed is requested, the vehicle speed may be deduced from the positions as determined for the user equipment contained in the vehicle. Accordingly, the user equipment does not necessarily have access to any control data provided in the vehicle.

The service may be provided as Nnef_EventExposure service extension or as Nnwdaf_EventExposure service extension with new parameters related to expose vehicle related information.

The invention claimed is:

1. A method for operating a network exposure entity configured to act as the entry point into a cellular network, for interacting with an application entity external to the cellular network, the method comprising:

receiving a first request from the external application entity requesting vehicle related information, the vehicle related information comprising a vehicle identifier, at least one vehicle related parameter of a vehicle, and a parameter limit associated with each vehicle parameter;

transmitting a subscription request to a node within the cellular network acting as a collecting entity configured to collect the vehicle related information for the vehicle, the transmitted subscription request comprising the vehicle identifier, at least one vehicle related parameter, and associated parameter limit(s);

in response to at least one vehicle related parameter reaching the associated parameter limit, receiving a first notification from the collecting entity in response to the subscription request, the first notification comprising information related to the at least one vehicle related parameter; and transmitting a second notification to the external application entity comprising the vehicle identifier and the information related to the at least one vehicle related parameter.

2. The method according to claim 1, further comprising:

transmitting a second request to a subscriber database of the cellular network asking the subscriber database which entity is configured to operate as the collecting entity; and receiving a response message from the subscriber database, the response message comprising a collecting entity identifier allowing the collecting entity to be identified, wherein the subscription request is transmitted based on the collecting entity identifier.

3. The method according to claim 1, wherein the subscription request is transmitted to at least one of a user equipment connected to the cellular network and provided in the vehicle and operating as the collecting entity, and a network data analytics entity of the cellular network operating as the collecting entity.

4. The method according to claim 1, wherein the at least one vehicle related parameter comprises at least one of the following parameters:

a vehicle speed;

a vehicle position;

a distance a vehicle has traveled along a certain type of road; and a number of passengers provided in the vehicle.

5. The method according to claim 1, wherein at least one of the first request and the subscription request is implemented as an event exposure request.

6. A method for operating a user equipment provided in a vehicle and connected to a cellular network, the method comprising:

receiving, from a network exposure entity configured to act as the entry point into the cellular network, for interacting with an application entity external to the cellular network, a subscription request comprising a vehicle identifier, at least one vehicle related parameter, and a parameter limit associated with each vehicle parameter;

monitoring the at least one vehicle related parameter; and in response to at least one vehicle related parameter reaching the associated parameter limit, transmitting a notification to the network exposure entity, the notification comprising information related to the at least one vehicle related parameter.

7. The method according to claim 6, further comprising transmitting an establishment request to a mobility management entity of the cellular network, the establishment request comprising an indication that vehicle information can be exposed outside the vehicle, the vehicle information comprising a vehicle identifier, the at least one vehicle related parameter, and a communication channel where the vehicle information is exposed, wherein the notification is only transmitted to the network exposure entity in response to the subscription request, when the at least one vehicle related parameter is present in the vehicle information.

8. A method for operating a subscriber database of a cellular network, the method comprising:

receiving a registration request from a session control entity of the cellular network for a user equipment connected to a vehicle, the registration request comprising vehicle related parameters and a communication channel where each of the vehicle related parameters is exposed, the communication channel identifying a node within the cellular network acting as a collecting entity configured to collect each of the vehicle related parameters;

receiving a profile request from the session control entity for a subscription profile of the user equipment;

transmitting a response to the session control entity in response to the received profile request, the response comprising the communication channel;

receiving a request from a network exposure entity requesting which collecting entity is configured to collect at least one of the vehicle related parameters; and transmitting a response to the network exposure entity in response to the received request, the response comprising a collecting entity identifier identifying the collecting entity which is configured to collect the at least one vehicle related parameter.

9. The method according to claim 8, wherein the vehicle related parameter comprises at least one of the following parameters:

a vehicle speed;

a vehicle position;

a distance a vehicle has traveled along a certain type of road; and a number of passengers provided in the vehicle.

10. A method for operating a network data analytics entity that operates as a collecting entity of a cellular network, the method comprising:

receiving, from a network exposure entity configured to act as the entry point into the cellular network, for interacting with an application entity external to the cellular network, a subscription request comprising a vehicle identifier, at least one vehicle related parameter, and a parameter limit associated with each vehicle parameter;

collecting information related to the at least one vehicle related parameter; and in response to at least one vehicle related parameter reaching the associated parameter limit, transmitting a notification to the network exposure entity, the notification comprising the information related to the at least one vehicle related parameter.

* * * * *